United States Patent [19]
Hunsberger et al.

[11] Patent Number: 6,129,176
[45] Date of Patent: *Oct. 10, 2000

[54] SOUND ATTENUATING MOTOR END SHIELD

[75] Inventors: Dale Hunsberger, Rockford; Julie Harwath, Oregon; Frank Harwath, Stillman Valley, all of Ill.

[73] Assignee: Suntec Industries, Inc., Rockford, Ill.

[*] Notice: Under 35 U.S.C. 154(b), the term of this patent shall be extended for 143 days.

[21] Appl. No.: 08/908,896

[22] Filed: Aug. 8, 1997

Related U.S. Application Data

[60] Provisional application No. 60/024,014, Aug. 15, 1996.

[51] Int. Cl.$^7$ ...................................................... H02K 5/24
[52] U.S. Cl. ........................ 181/202; 181/198; 181/200; 181/201; 181/202; 181/205; 181/207; 181/209; 417/312; 417/423.14; 417/410.4; 417/572; 310/51; 310/89; 310/157
[58] Field of Search ..................................... 181/198, 200, 181/201, 202, 205, 207, 209; 417/312, 423.14, 410.4, 572; 310/51, 89, 157

[56] References Cited

U.S. PATENT DOCUMENTS

| | | | |
|---|---|---|---|
| 2,139,370 | 12/1938 | Lauer et al. | 103/118 |
| 2,190,246 | 2/1940 | Schirmer | 103/118 |
| 2,309,683 | 2/1943 | Wahlmark | 103/42 |
| 3,407,739 | 10/1968 | Myers | 103/87 |
| 3,463,949 | 8/1969 | Stone | 310/42 |
| 3,500,083 | 3/1970 | Dochterman | 310/51 |
| 3,824,035 | 7/1974 | Laing | 415/219 C |
| 3,837,767 | 9/1974 | Aller | 417/424 |
| 3,960,237 | 6/1976 | Sleeper | 181/33 K |
| 4,064,903 | 12/1977 | Soulsby et al. | 137/375 |
| 4,644,204 | 2/1987 | Lakin | 310/89 |
| 4,661,731 | 4/1987 | Wenz | 310/51 |
| 5,327,036 | 7/1994 | Carey | 310/89 |
| 5,354,182 | 10/1994 | Niemiec et al. | 417/363 |
| 5,536,140 | 7/1996 | Wagner et al. | 415/119 |
| 5,605,448 | 2/1997 | Martin, Sr. | 417/360 |

FOREIGN PATENT DOCUMENTS

| | | |
|---|---|---|
| 372718 | 6/1990 | European Pat. Off. . |
| 550706 | 7/1993 | European Pat. Off. . |
| 4201401 | 7/1993 | Germany . |
| 5915634 | 1/1984 | Japan . |
| 2112585 | 7/1983 | United Kingdom . |
| WO 92/15785 | 9/1992 | WIPO . |

*Primary Examiner*—David S. Martin
*Assistant Examiner*—Edgardo San Martin
*Attorney, Agent, or Firm*—Leydig, Voit & Mayer, Ltd

[57] ABSTRACT

A hydraulic pump-motor having an end shield which deadens the sound generated by the pump-motor do thereby result in a quieter unit. The present invention provides a conventional hydraulic pump-motor having an electric motor coupled to a pumping mechanism wherein the motor includes an improved sound attenuating end shield design. Through the use of acoustically deadening materials such as cast iron and polypropylene plastic, the end plates of the present invention deaden the sounds stemming from the vibration of the pump-motor. In addition, the present invention provides an end shield design which allows the stator to be secured to the motor housing and the air gap between the rotor and the stator to be precisely measured prior to the installation of the end shield. The present invention therefore results in not only a quieter pump-motor but also a pump-motor with higher machining tolerances, improved efficiency, and lower production and maintenance costs.

17 Claims, 3 Drawing Sheets

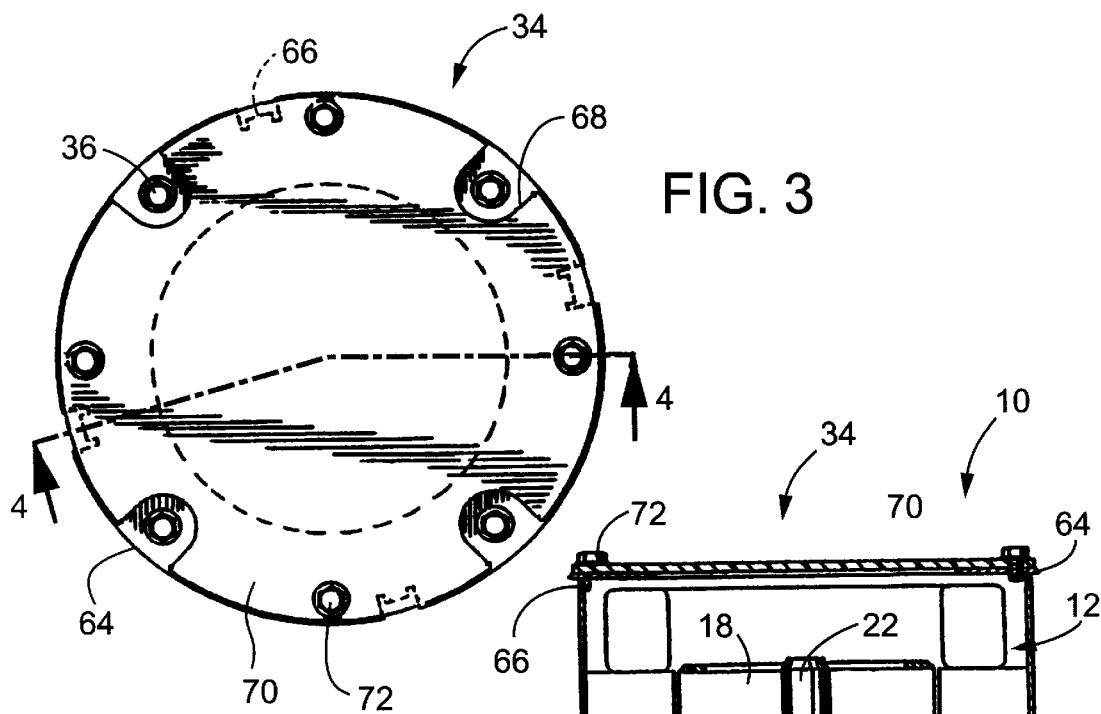
FIG. 3
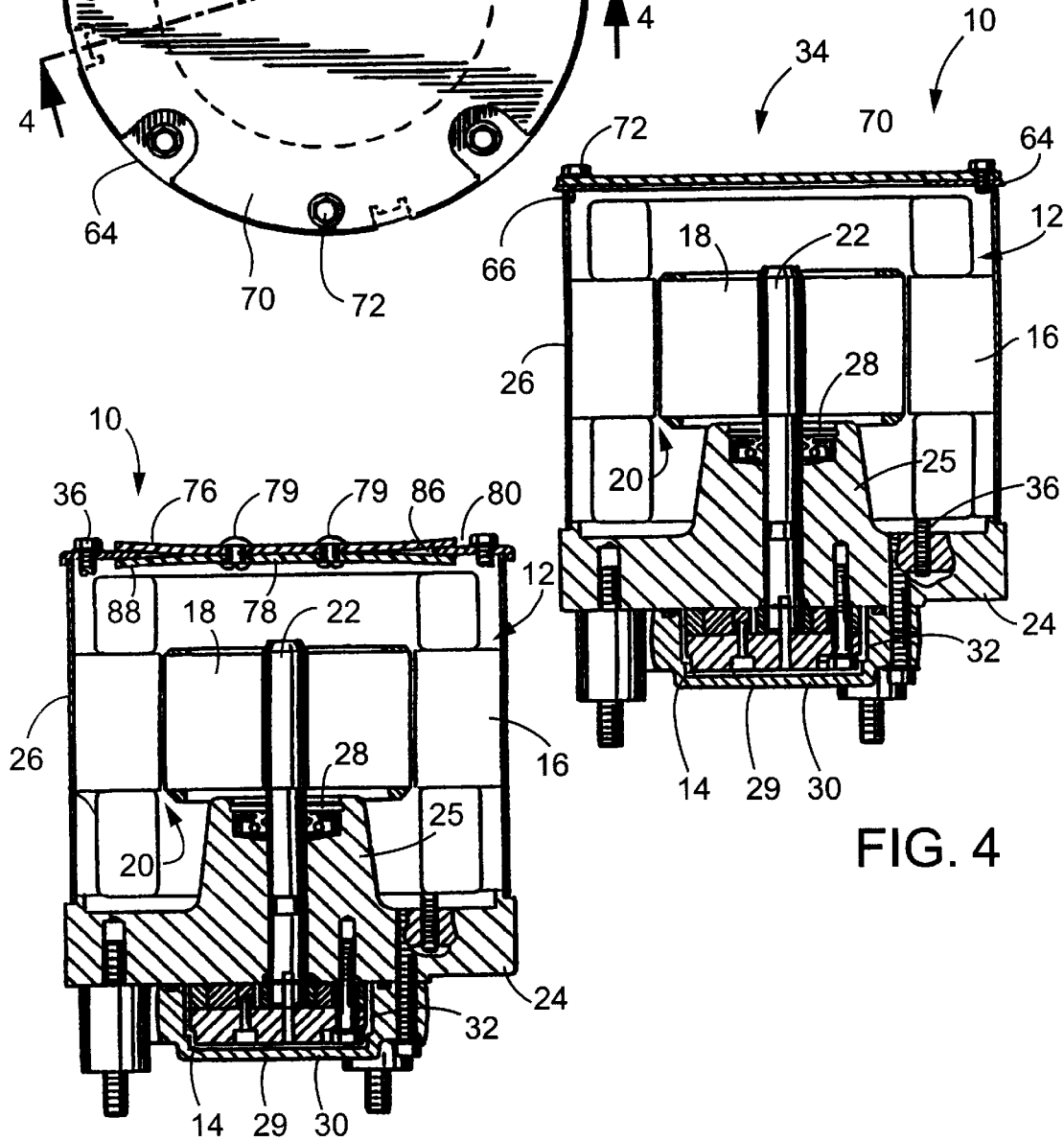
FIG. 4
FIG. 5

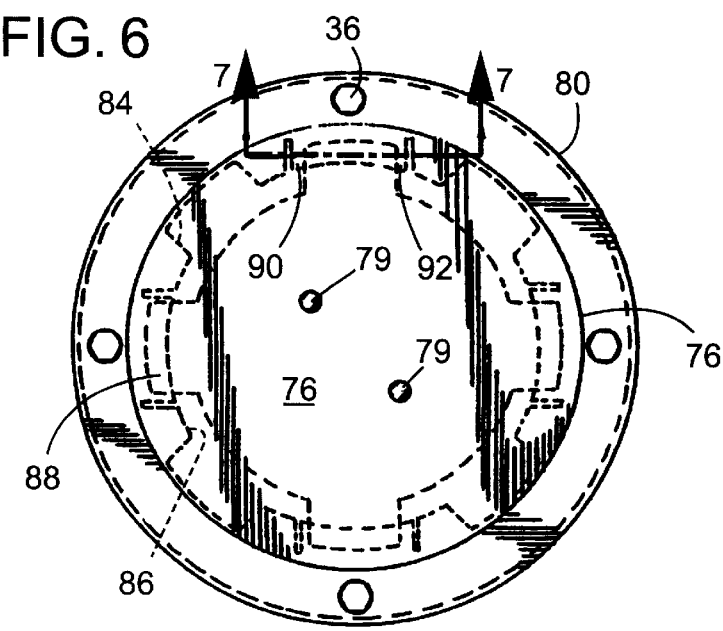
FIG. 6
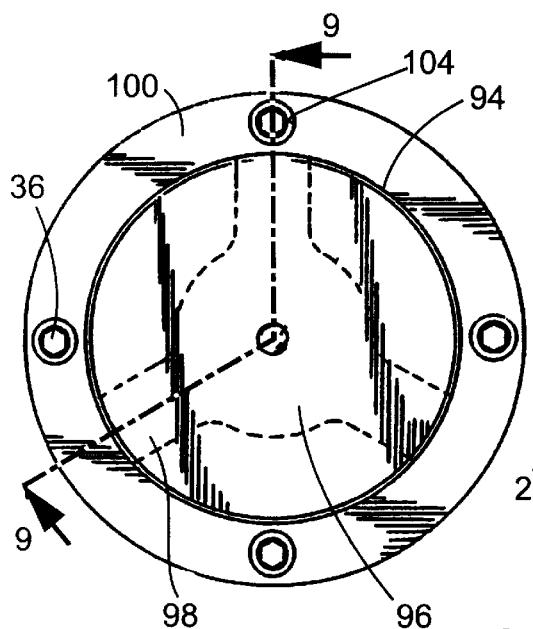
FIG. 8
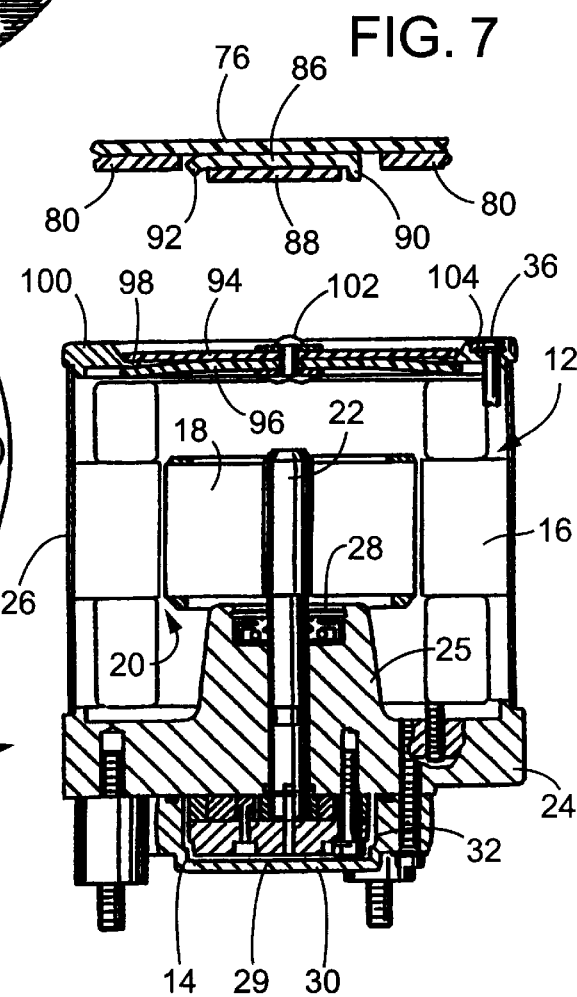
FIG. 7
FIG. 9

SOUND ATTENUATING MOTOR END SHIELD

CROSS-REFERENCE TO RELATED APPLICATION

This application claims the priority date benefit of U.S. Provisional patent application Ser. No. 60/024,014, filed on Aug. 15, 1996, pursuant to 37 CFR § 1.78(a)(3).

FIELD OF THE INVENTION

The present invention generally relates to hydraulic pump-motors, and more particularly relates to hydraulic pump-motor housings.

BACKGROUND OF THE INVENTION

In a typical hydraulic pump-motor, an electric motor is provided to drive a hydraulic pump and increase the pressure of the hydraulic fluid processed through the pump. By varying the hydraulic load, the resulting output pressure of the hydraulic fluid is correspondingly varied and a broad range of pressures is obtainable.

However, the operation of the motor and pump results in considerable vibration of the pump-motor unit, which is communicated to the end shield of the motor and ultimately to those in the vicinity of the pump-motor in the form of noise. The shape and position of conventional motor end shields, as well as the material from which the end shields are typically manufactured, have contributed to a drum-like effect in that the end shield reverberates during operation and thereby produces considerable acoustic output. This problem is accentuated when the pump is of a reciprocating type in that with each movement of the piston a pulse is generated, and this pulsating output is transmitted to the end shield of the motor. Since such pump-motors are commonly used in commercial applications, e.g., dental chairs, cosmetology chairs, and hospital beds, this output noise has been the source of substantial annoyance and dissatisfaction.

The prior art has typically employed a standard die cast aluminum end shield which provides little, if any noise attenuation. Some improvement has been attained by making the end shield of cast iron as opposed to aluminum. Given the natural frequency of these metals and the frequency with which pump-motors vibrate, as well as the planar shape of typical end shields, these end shields have proven to have inadequate sound deadening characteristics and, in fact, act much like a drum as the pump-motor operates.

In an effort to improve noise reduction, the standard die case aluminum end shields of typical pump-motors have been replaced by specially shaped cast iron, plastic, or other material end shields. Given the natural frequency and sound deadening effects of such shapes, this design has provided improved sound reduction, but even greater reduction in acoustic output is desirable.

Moreover, typical end shields are secured to the motor via the same bolts which hold the stator of the motor in place. Therefore the end shield must be made from a material with sufficient strength to provide a good clamping surface for the stator screws. However, materials with good sound antenuation qualities often do not have sufficient strength to provide a good clamping surface. In addition, since the same screws which hold the stator in place also hold the end shield in place, the prior art has had difficulty in accurately measuring the air gap between the rotor and stator, after the end shield has been fastened to the motor.

SUMMARY OF THE INVENTION

It is a primary aim of the present invention to provide an end shield for a hydraulic pump-motor with improved sound attenuation characteristics.

An objective of the present invention is to provide a motor end shield which reduces sound output, while it increases the ease of motor assembly by allowing the end shield to be installed after the motor air gap is accurately measured.

A further objective of the present invention is to provide a pump-motor with reduced production and maintenance costs.

A still further objective of the present invention is to provide an improved method of assembling a pump having a sound attenuating end shield In accordance with these and other aims and objectives of the present invention, a hydraulic pump-motor end shield is provided having multiple embodiments, wherein each embodiment improves the motor attenuation characteristics of known motor end shields, and which facilitates the efficient and accurate assembly of the motor-pump unit. Each of the end shield embodiments disclosed herein provides an end shield manufactured from a sound deadening material such as cast iron or plastic to thereby reduce the acoustic output of the pump-motor. With certain embodiments disclosed herein a metal outer ring is utilized in order to provide a good clamping surface to securely hold the motor stator in place and to assist in maintaining the torque of the stator screws. A plastic motor end shield is then fastened to the metal outer ring. The metal outer ring also helps to deaden sound by separating the plastic shield from direct contact with the vibrating motor housing.

In another embodiment, the metal outer ring is secured to the motor stator with a single plastic motor end shield secured to the motor outer ring via screws other than the stator screws. This provides a cost effective method for reducing the acoustic output of the pump-motor.

In another embodiment, the motor end shield is comprised of two plastic disks which are fastened together at a central location and which are dimensioned to grip near the inner diameter of the outer motor end ring. Therefore, the outer motor end ring need not be removed in order to remove the plastic end shield. Rather, the lower end shield disk is provided with a plurality of radially protruding tabs, and the outer motor ring is provided with a corresponding number of grooves into which the tabs of the lower disk fit. To secure the end shield to the motor, the disk tabs are aligned with the ringed grooves, and the end shield is then rotated such that the disk tabs engage the bottom surface of the motor ring and sandwich the motor ring between the disk tabs and the top disk. This alternative not only provides sound attenuation, but also provides easier motor assembly in that the motor air gap between the rotor and stator can be accurately measured and secured, and the motor end shield can then be fastened to the motor.

In a still further embodiment, the lower plastic disk is provided with elastically deformable, radially disposed, legs which can be elastically deformed to engage the lower surface of the outer metal ring, while the top disk engages the top surface of the outer metal ring.

These and other aims, objectives, and features of the present invention will become apparent from the following detailed description when taken in conjunction with the accompanying drawings.

BRIEF DESCRIPTION OF THE DRAWINGS

FIG. 3 is a top view of a third embodiment of the present invention;

FIG. 4 is a sectional view taken along line 4—4 of FIG. 3;

FIG. 5 is a sectional view of a fourth embodiment of the present invention;

FIG. 6 is a top view of the embodiment shown in FIG. 5;

FIG. 7 is a sectional view of the end shield and motor ring of the fourth embodiment taken along line 7—7 of FIG. 6;

FIG. 8 is a top view of a fifth embodiment of the present invention.

FIG. 9 is a sectional view of the fifth embodiment taken along line 9—9 of FIG. 8.

While the present invention will be described and disclosed in connection with certain preferred embodiments and procedures, it is not intended to limit the invention to those specific embodiments disclosed. Rather it is intended to cover all such alternative embodiments and modifications as found within the sphere and scope of the present invention.

DETAILED DESCRIPTION OF THE PREFERRED EMBODIMENTS

Figure 1:
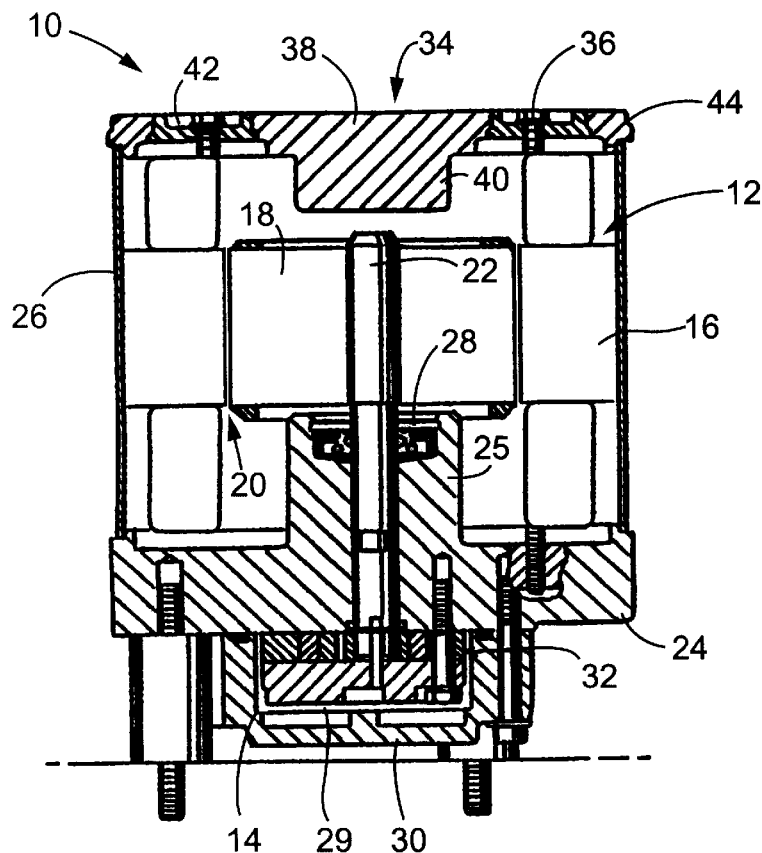
FIG. 1 is a sectional view of a first embodiment of the present invention.

Referring now to the drawings, and in particular to FIG. 1, the first embodiment of the present invention is shown in cross-section. As shown, pump-motor 10 includes motor 12 and pump 14 with motor 12 including stator 16 and rotor 18. Rotor 18 is mounted, as is conventional, within stator 16 with air gap 20 therebetween and includes shaft 22 which extends from rotor 18 into pump 14. Motor 12 is peripherally surrounded by motor housing 26 and is bounded on one end by pump body 24. Pump body 24 includes central hub 25 through which shaft 22 is rotatably mounted. Central hub 25 also includes seal assembly 28 which protects motor 12 from contaminates and fluid being communicated from pump 14.

Pump 14 is of a conventional gear pump design having pump cavity 29 formed by pump cover 30 and pump body 24. Pump 14 is provided with a gear set 32 which compresses in-flowing fluid and discharges fluid at an increased pressure. The gears of gear set 32 are provided motion through shaft 22 as rotor 18 rotates within stator 16.

The end of pump-motor 10 opposite pump 14 is closed by end shield 34, which in the first embodiment shown in FIG. 1, is secured to pump 10 by stator screws 36. Screws 36 extend through stator 16 and are secured to pump body 24. As best shown in FIG. 1, the first embodiment provides a unitary end shield 34 comprised of planar member 38. Planar member 38 is preferable manufactured of cast iron, but could be manufactured of materials having similar natural frequencies and sound deadening qualities.

To increase the sound attenuation characteristics of end shield 34 of the first embodiment, central mass 40 is provided integral with planar member 38. Central mass 40 disrupts the planar shape of member 38 and therefore diminishes the drum-like effect. Planar member 38 is also provided with apertures 42 through which stator screws 36 penetrate, and outer diameter 44 which is dimensioned to correspond to the outer diameter of motor housing 26.

Figure 2:
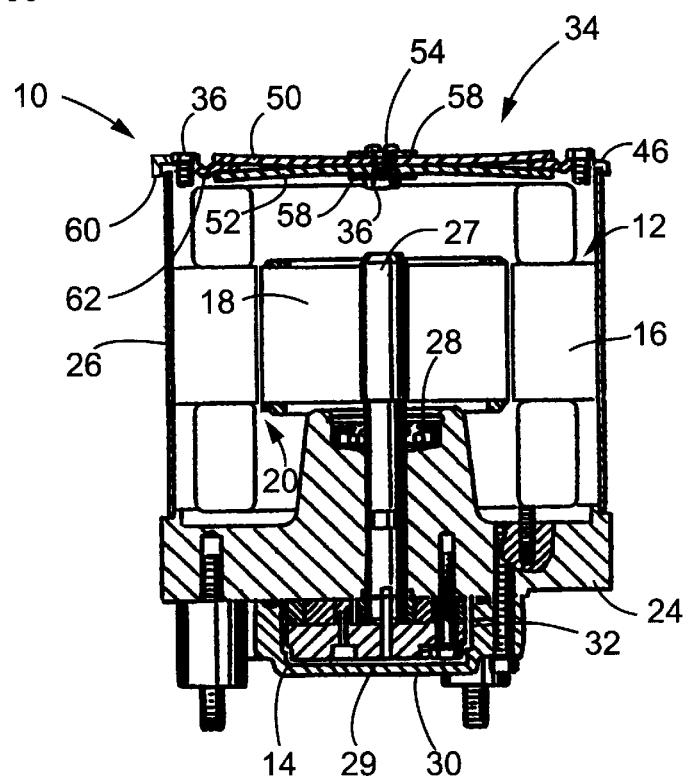
FIG. 2 is a sectional view of a second embodiment of the present invention.

Referring now to FIG. 2, the second embodiment of the present invention is shown in cross-section. It is to be understood that where similar elements are provided throughout the several embodiments, identical reference numerals are used to depict the same elements.

Unlike the first embodiment, the second embodiment is not of a unitary design, rather it is comprised of several components. The second embodiment includes outer ring 46, preferably manufactured from steel, and end shield 34. End shield 34 is comprised of top disk 50 and bottom disk 52 which are secured together by screw 54, nut 56 and washers 58. In lieu of screw 54, nut 56, and washers 58, top disk 50 and bottom disk 52 could be secured together by a rivet or a similar fastening mechanism.

To ensure proper placement of the elements, outer ring 46 is provided with circumferential lip 60 and annular ridge 62. As shown in FIG. 2, circumferential lip 60 fits over the outer diameter of motor housing 26 to prevent outer ring 46 from moving in a direction transverse to shaft 22. Top disk 50 and bottom disk 52 span across outer ring 46 to completely cover the end of motor 12. With the second embodiment top disk 50 and bottom disk 52 are secured to outer ring 46 prior to securing the components to motor 12. End shield 34 is assembled by sandwiching outer ring 46 between top disk 50 and bottom disk 52 and tightening nut 56 onto screw 54.

To ensure proper placement of top disk 50 and bottom disk 52 relative to outer ring 46, annular ridge 62 is provided in outer ring 46 to prevent movement of top disk 50 and bottom disk 52 in a direction transverse to shaft 22. Once top disk 50 and bottom disk 52 are secured to outer ring 46, outer ring 46 is secured to motor 12 by stator screws 36 which penetrate through screw apertures 48 provided in outer ring 46.

Turning now to FIGS. 3 and 4, the third embodiment of the present invention is depicted and the method by which the third embodiment is assembled will be described. As best shown in FIG. 3, the motor and pump are identical to the first and second embodiments with the differences centering on end shield 34. In the third embodiment end shield 34 is comprised of outer ring 64 and end cap 70. To ensure proper placement of outer ring 64 on motor 12, outer ring 64 is provided with four downwardly depending fingers 66 as best shown in FIG. 4. Fingers 66 are positioned to frictionally engage the inner diameter of motor housing 26 as best shown in FIG. 3.

End cap 70 is preferably manufactured from plastic such as nylon or polypropylene, and outer ring 64 is preferably manufactured from steel. As best shown in FIG. 3, end cap 70 has a diameter sufficient to span across motor housing 26 and is provided with recesses 68 which align with stator screws 36 as best shown in FIG. 4. The third embodiment allows the outer ring 64 to be installed prior to the installation of plastic end cap 70. Outer ring 64 is secured to motor 12 via stator screws 36. This allows outer ring 64 to be secured and air gap 20 to be precisely measured prior to installation of plastic end cap 70. Moreover, the strength of steel outer ring 64, provides a good clamping surface to securely hold stator 16 in place, and assists in maintaining the torque of stator screws 36. Once air gap 20 is measured and, outer ring 64 is secured in place, end cap 70 is secured to outer ring 64 by end cap screws 72.

Referring now to FIGS. 5–7, the fourth embodiment of the present invention is shown the method by which the fourth embodiment is assembled will be described. The fourth embodiment is similar to the second embodiment in that outer ring 80 is sandwiched between top disk 76 and bottom disk 78. Top disk 76 and bottom disk 78 are secured together via rivets 79. However, given the design of the fourth embodiment, outer ring 80 can be secured to motor 12 prior to the installation of top disk 76 and bottom disk 78 to allow air gap 20 between rotor 18 and stator 16 to be precisely measured prior to the installation of top disk 76 and bottom disk 78. With specific reference to FIG. 6, bottom disk 78 is shown having four radial flaps 88 which are adapted to align with four slots 84 provided in outer ring 80. Once flaps 88 of bottom disk 78 are aligned with slots 84, and top disk 76 comes in contact with the top edge of outer ring 80, top disk 76 and bottom disk 78 are rotated to lock end shield 34 in place.

As best shown in FIG. 5, outer ring 80 includes a plurality of latch tabs 86 which fit between top disk 76 and bottom disk 78. Each latch tab 86 is provided with a locking edge 90 and a retaining edge 92 (FIG. 7). Locking edge 90 is provided perpendicular to latch tab 86 to provide a positive stop to disk flaps 88 as bottom disk 78 is rotated into the locked position. Once bottom disk 78 is rotated to the locked position, retaining edge 92 engages disk flaps 88 to temporarily retain bottom disk 78 in the locked position until sufficient torsional force is applied to top disk 76 and bottom disk 78 to rotate bottom disk 78 out of the locked position and thereby move latch tabs 86 out of engagement with retaining edge 92. Retaining edge 92 is preferably provided at a 30° angle from latch tabs 86, although other retaining mechanisms are possible. Also, outer ring 64 is preferably manufactured from steel and top disk 76 and bottom disk 78 are preferably manufactured from polypropylene plastic, although other materials having similar characteristics are possible.

Referring now to FIGS. 8 and 9, the fifth embodiment of the present invention is depicted and the method by which the fifth embodiment is assembled will be described. The fifth embodiment is similar to the fourth embodiment except that outer ring 100 is not provided with slots through which legs 98 fit prior to assembly. Rather, the fifth embodiment provides top disk 94 and bottom disk 96 wherein bottom disk 96 includes three legs 98 as best shown in FIG. 9 which fit below outer ring 100 to sandwich outer ring 100 between top disk 94 and bottom disk 96 as best shown in FIG. 8. Although it three legs 98 are shown, it is to be understood that a different number of legs could be employed. Top disk 94 and bottom disk 96 are secured together by rivet 102. Given the flexible nature of polypropylene plastic, legs 98 of bottom disk 96 can be elastically deformed to fit under outer ring 100 after outer ring 100 has been secured to motor 12 by stator screws 36. Outer ring 100 includes countersinks 104 to receive the heads of stator screws 36. This design enables air gap 20 to be measured, and stator 16 to be secured in place prior to the installation of top disk 94 and bottom disk 96. When it is desired to access the interior of pump-motor 10, top disk 94 and bottom disk 96 can be similarly removed.

In operation, each of the embodiments disclosed herein provides improved sound attenuation characteristics through the use of plastic or cast iron end shields 34. Since the natural frequencies of these materials do not correspond to the frequency with which pump-motor 10 vibrates, the vibrational energy imparted by motor 12 and pump 14 is substantially deadened by end shield 34 to thereby reduce the acoustic output of pump-motor 10.

With the first embodiment, the end shield of cast iron having central body 40 provides additional mass to endshield 34 to disrupt any potential reverberation. With embodiments 2–5, end shield 34 is manufactured from plastic, either one or two pieces, which is attached to an outer motor end ring. The outer end ring is separate from the motor housing to provide a surface to which stator screws 36 can be clamped, and air gap 20 can be measured prior to installation of the plastic end shield. Since the plastic is not in direct contact with the motor housing, and has an appropriate natural frequency, the acoustic output of pump-motor 10 is reduced.

Additionally, embodiments 3–5 provide methods which improve upon the ease with which pump-motor 10 can be assembled in that they provide designs wherein air gap 20 between rotor 18 and stator 16 can be precisely measured, and stator 16 can be secured via screws 36 prior to the installation of plastic end shield 34. These embodiments therefore not only provide improved sound attenuation characteristics, but also improve upon the ease with which pump-motor 10 can be assembled and maintained.

While this invention has been described with an emphasis upon preferred embodiments, it will be obvious to those of ordinary skill in the art that variations of the preferred embodiments may be used and that it is intended that the invention may be practiced otherwise than is specifically described herein. Moreover, it is to be understood that the various features described in the various embodiments disclosed herein can be used in different combinations than those described herein. Accordingly this invention includes all modifications encompassed within the spirit and scope of the invention.

What is claimed is:

1. An end shield for a hydraulic pump-motor of the type having a motor mechanically linked to a pump and a housing surrounding the motor, the housing having a first and second open ends, the pump closing the first open end, the end shield closing the second open end, the end shield comprising:

a metal annular ring secured to the motor housing, the ring being attached via bolts securing the motor to the housing; and a plastic end plate secured to the metal annular ring and substantially closing the second open end, the plastic end plate including first and second layers, the metal annular ring being sandwiched between the first and second layers.

2. The end shield of claim 1 wherein the plastic layers are secured to the annular ring before attachment of the annular ring to the housing.

3. The end shield of claim 1 wherein the annular ring has an outer circumference and a plurality of downwardly depending fingers positioned to frictionally engage an inner surface of motor housing.

4. The end shield of claim 1 wherein the second layer including a plurality of radially extending arms, the annular ring including a corresponding number of slots, the arms adapted to be received through the slots and rotated along with the first layer relative to the annular ring to removably lock the end plate in position.

5. The end shield of claim 1 wherein the second layer includes a plurality of elastically deformable and radially extending arms, the arms adapted to be deformed under the annular ring to secure the end plate to the motor.

6. The end shield of claim 2 wherein the annular ring includes an annular ridge positioned to engage outer circumferences of the first and second layers and thereby prevent lateral movement of the end plate relative to the motor.

7. The end shield of claim 2 wherein the first and second layers are secured together by at least one fastener.

8. The end shield of claim 4 wherein the slots included plurality of raised edges to serve as locking tabs to prevent inadvertent removal of the end plate.

9. The end shield of claim 4 wherein the first and second layers are secured together by at least one fastener.

10. The end shield of claim 5 wherein the first and second layers are secured together by at least one fastener.

11. A hydraulic pump-motor, comprising:

a pump contained in a body;

a motor including a rotor and a stator, the stator supported by the body, the rotor mechanically linked to the pump and supported for rotation only by the body;

a motor housing having first and second open ends, the body closing the first open end; and an end shield closing the second open end, the end shield not supporting the rotor in any way, being completely free of the rotor and covering the radial span of the stator such that the shield is subject to a potential drum reverberation effect, the end shield further including a central mass disrupting the shape of the end shield to diminish the potential drum reverberation effect.

12. The hydraulic pump-motor of claim 11 wherein the end shield is manufactured from a material selected from the group consisting of cast iron and plastic.

13. A hydraulic pump-motor, comprising:

a pump contained in a body;

a motor including a rotor and a stator, the stator supported by the body, the rotor mechanically linked to the pump and supported for rotation only by the body;

a motor housing having first and second open ends, the body closing the first open end; and an end shield closing the second open end, the end shield not supporting the rotor in any way, being completely free of the rotor and covering the radial span of the stator such that the shield is subject to a potential drum reverberation effect, the end shield being constructed from multiple pieces to diminish the potential drum reverberation effect, including:

(a) a metal annular ring secured to the motor housing and extending radially inward from the motor housing to cover a portion of the motor; and (b) a plastic end plate secured to the metal ring and substantially closing the second open end.

14. The end shield of claim 13 wherein the plastic end plate includes first and second layers, the metal annular ring being sandwiched between the first and second layers.

15. The end shield of claim 13 wherein the annular ring has an outer circumference and a plurality of downwardly depending fingers positioned to frictionally engage an inner surface of motor housing.

16. The end shield of claim 14 wherein the annular ring includes an annular ridge positioned to engage outer circumferences of the first and second layers and thereby prevent lateral movement of the end plate relative to the motor.

17. The end shield of claim 14 wherein the first and second layers are secured together by at least one fastener.

* * * * *